(12) United States Patent
Martens et al.

(10) Patent No.: US 11,945,939 B2
(45) Date of Patent: Apr. 2, 2024

(54) POLYPROPYLENE COMPOSITION COMPRISING GLASS FIBERS

(71) Applicant: SABIC GLOBAL TECHNOLOGIES B.V., Bergen op Zoom (NL)

(72) Inventors: Johannes Peter Antonius Martens, Elsloo (NL); Jana Hrachova, Maastricht (NL); Lidia Jasinska-Walc, Eindhoven (NL); Ronald Julianus Peter Schipper, Brunssum (NL); Robbert Duchateau, Roostenlaan (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 297 days.

(21) Appl. No.: 16/768,176

(22) PCT Filed: Dec. 7, 2018

(86) PCT No.: PCT/EP2018/083925
§ 371 (c)(1),
(2) Date: May 29, 2020

(87) PCT Pub. No.: WO2019/121061
PCT Pub. Date: Jun. 27, 2019

(65) Prior Publication Data
US 2020/0308382 A1 Oct. 1, 2020

(30) Foreign Application Priority Data

Dec. 22, 2017 (EP) ..................... 17210365

(51) Int. Cl.
| | |
|---|---|
| C08L 23/12 | (2006.01) |
| B29C 65/00 | (2006.01) |
| B29C 65/48 | (2006.01) |
| B29C 71/04 | (2006.01) |
| B29K 23/00 | (2006.01) |
| B29K 309/08 | (2006.01) |
| B29L 31/30 | (2006.01) |
| B32B 7/12 | (2006.01) |
| B32B 27/08 | (2006.01) |
| B32B 27/20 | (2006.01) |
| B32B 27/32 | (2006.01) |
| B62D 25/14 | (2006.01) |
| B62D 29/04 | (2006.01) |
| B62D 33/023 | (2006.01) |
| E05B 85/10 | (2014.01) |

(52) U.S. Cl.
CPC .............. *C08L 23/12* (2013.01); *B29C 65/48* (2013.01); *B29C 66/7212* (2013.01); *B29C 71/04* (2013.01); *B32B 7/12* (2013.01); *B32B 27/08* (2013.01); *B32B 27/20* (2013.01); *B32B 27/32* (2013.01); *B62D 25/14* (2013.01); *B62D 29/043* (2013.01); *B62D 33/023* (2013.01); *E05B 85/10* (2013.01); *B29K 2023/12* (2013.01); *B29K 2309/08* (2013.01); *B29L 2031/3005* (2013.01); *B32B 2262/101* (2013.01); *B32B 2605/08* (2013.01); *C08L 2205/025* (2013.01); *C08L 2205/035* (2013.01)

(58) Field of Classification Search
CPC ..... B62D 24/14; C08L 2207/02; C08L 23/10; C08L 23/12; C08L 23/14; C08L 23/142; C08L 23/16; C08L 23/26; C08L 2666/72; C08L 2023/44; C08L 51/06; C08L 79/02; C08G 65/3306
See application file for complete search history.

(56) References Cited

U.S. PATENT DOCUMENTS

| | | |
|---|---|---|
| 3,654,370 A | 4/1972 | Yeakey |
| 4,399,054 A | 8/1983 | Ferraris et al. |
| 4,472,524 A | 9/1984 | Albizzati |
| 5,017,714 A | 5/1991 | Welborn, Jr. |
| 5,324,820 A | 6/1994 | Baxter |
| 5,783,630 A | 7/1998 | Evans et al. |
| 6,031,048 A * | 2/2000 | Evans .................... C08L 23/10 525/193 |

(Continued)

FOREIGN PATENT DOCUMENTS

| | | |
|---|---|---|
| WO | 9851742 A1 | 11/1998 |
| WO | 2006010414 A1 | 2/2006 |
| WO | 2009080281 A1 | 7/2009 |

OTHER PUBLICATIONS

Ser Van Der Ven; "Polypropylene and other Polyolefins"; Elsevier 1990, pp. 8-10.

(Continued)

*Primary Examiner* — Lee E Sanderson
(74) *Attorney, Agent, or Firm* — CANTOR COLBURN LLP

(57) ABSTRACT

The invention relates to a composition comprising a) a propylene homopolymer and/or a propylene copolymer consisting of at least 70.0 wt % of propylene monomer units and at most 30.0 wt % of comonomer units selected from ethylene monomer units and α-olefin monomer units having 4 to 10 carbon atoms, b) an optional ethylene-α-olefin copolymer, c) glass fibers and d) a reaction product of d1) a functionalized polypropylene and d2) a polyetheramine, wherein the total amount of a) and b) is 10.0 to 80.0 wt % or 20.0 to 80.0 wt % with respect to the total composition, the amount of c) is 5.0 to 50.0 wt % with respect to the total composition, the amount of d2) is at least 5.0 wt % with respect to the total composition and the weight ratio of d2) to d1) is at least 0.050.

23 Claims, No Drawings

(56) References Cited

U.S. PATENT DOCUMENTS

| | | | | |
|---|---|---|---|---|
| 6,093,496 | A * | 7/2000 | Dominguez | D01F 6/46 |
| | | | | 524/505 |
| 2012/0225993 | A1* | 9/2012 | Bernreitner | C08L 23/10 |
| | | | | 524/517 |
| 2014/0357771 | A1* | 12/2014 | Tranninger | C08L 23/14 |
| | | | | 524/210 |
| 2018/0371210 | A1* | 12/2018 | Dix | C08L 51/06 |

OTHER PUBLICATIONS

European Search Report for European Application No. 17210365.7 dated Mar. 12, 2018, 5 pages.
International Search Report for International Application No. PCT/EP2018/083925, International Filing Date Dec. 7, 2018, dated Jan. 18, 2019, 5 pages.
Written Opinion for International Application No. PCT/EP2018/083925, International Filing Date Dec. 7, 2018, dated Jan. 18, 2019, 6 pages.

* cited by examiner

POLYPROPYLENE COMPOSITION COMPRISING GLASS FIBERS

CROSS REFERENCE TO RELATED APPLICATIONS

This application is a National Stage application of PCT/EP2018/083925, filed Dec. 7, 2018, which claims the benefit of European Application No. 17210365.7, filed Dec. 22, 2017, both of which are incorporated by reference in their entirety herein.

The invention relates to a polypropylene composition comprising glass fibers suitable for making parts which can be adhered to another part with a high bonding strength. The invention also relates to a process for adhering such parts.

It is often necessary for polypropylene (PP) parts for automotive applications to be painted or bonded to another part. Painting or bonding generally requires surface treatments such as flaming or plasma treatment in order to achieve sufficient paint adhesion or bonding adhesion properties. The surface treatment process is a very delicate process which requires consideration of various parameters for optimal effect. Particularly when the part has a complex shape, such as parts made by injection molding, the surface treatment process becomes complex.

The general process for adhering PP parts comprises performing a surface treatment on the surface of the parts by plasma or flame, optionally applying a primer on the treated surfaces of one or both parts, applying an adhesive on one or both of the surfaces and bonding the parts together.

U.S. Pat. No. 5,783,630 discloses a composition useful for making molded automotive body parts comprising polypropylene, an elastomer and the reaction product of a functionalized polypropylene and a polyetheramine. The use of the reaction product of a functionalized polypropylene and a polyetheramine was found to improve paint adhesion. U.S. Pat. No. 5,783,630 does not mention bonding of parts made from the composition.

There is a need for a PP composition having a good bonding strength which requires less control on the surface treatments or no surface treatment.

In particular, automobile applications such as an instrumental panel carrier and a tailgate require a PP composition comprising glass fibers which needs to be bonded to another automobile part. There is thus a need for a PP composition comprising glass fibers with an improved bonding strength.

Accordingly, the invention provides a composition comprising:
a) a propylene homopolymer and/or a propylene copolymer consisting of at least 70.0 wt % of propylene monomer units and at most 30.0 wt % of comonomer units selected from ethylene monomer units and α-olefin monomer units having 4 to 10 carbon atoms,
b) an optional ethylene-α-olefin copolymer,
c) glass fibers and
d) a reaction product of d1) a functionalized polypropylene and d2) a polyetheramine, wherein the total amount of a) and b) is 10.0 to 80.0 wt % or 20.0 to 80.0 wt % with respect to the total composition,
the amount of c) is 5.0 to 50.0 wt % with respect to the total composition,
the amount of d2) is at least 5.0 wt % with respect to the total composition and the weight ratio of d2) to d1) is at least 0.050.

It was surprisingly found that a PP composition comprising glass fibers at amounts of 5.0 to 50.0 wt % requires polyetheramine at a specific amount and a specific weight ratio between the polyetheramine and the functionalized polyproylene for obtaining good bonding strength.

U.S. Pat. No. 5,783,630 mentions that the composition may comprise glass fibers up to 40%, but not its effect on the bonding strength. U.S. Pat. No. 5,783,630 does not mention that a specific combination of components is required for improving the bonding strength of a PP composition comprising 5.0 to 50.0 wt % of glass fibers.

a) and b)
Heterophasic Propylene Copolymer

In some embodiments, the composition comprises a heterophasic propylene copolymer consisting of a1) a matrix and b1) a dispersed phase, wherein component a) of the composition comprises a1) the matrix of the heterophasic propylene copolymer and component b) of the composition comprises b1) the dispersed phase of the heterophasic propylene copolymer.

Heterophasic propylene copolymers are generally prepared in one or more reactors, by polymerization of propylene in the presence of a catalyst and subsequent polymerization of an ethylene-α-olefin mixture. The resulting polymeric materials are heterophasic, but the specific morphology usually depends on the preparation method and monomer ratios used.

The heterophasic propylene copolymers employed in the process according to present invention can be produced using any conventional technique known to the skilled person, for example multistage process polymerization, such as bulk polymerization, gas phase polymerization, slurry polymerization, solution polymerization or any combinations thereof. Any conventional catalyst systems, for example, Ziegler-Natta or metallocene may be used. Such techniques and catalysts are described, for example, in WO06/010414; *Polypropylene and other Polyolefins*, by Ser van der Ven, Studies in Polymer Science 7, Elsevier 1990; WO06/010414, U.S. Pat. Nos. 4,399,054 and 4,472,524. Preferably, the heterophasic propylene copolymer is made using Ziegler-Natta catalyst.

The heterophasic propylene copolymer may be prepared by a process comprising
polymerizing propylene and optionally ethylene and/or α-olefin in the presence of a catalyst system to obtain the propylene-based matrix and
subsequently polymerizing ethylene and α-olefin in the propylene-based matrix in the presence of a catalyst system to obtain the dispersed ethylene-α olefin copolymer.

These steps are preferably performed in different reactors. The catalyst systems for the first step and for the second step may be different or same.

The heterophasic propylene copolymer of the composition of the invention consists of a propylene-based matrix and a dispersed ethylene-α-olefin copolymer. The propylene-based matrix typically forms the continuous phase in the heterophasic propylene copolymer. The amounts of the propylene-based matrix and the dispersed ethylene-α-olefin copolymer may be determined by $^{13}$C-NMR, as well known in the art.

The propylene-based matrix consists of a propylene homopolymer and/or a propylene copolymer consisting of at least 70.0 wt % of propylene monomer units and at most 30.0 wt % of comonomer units selected from ethylene monomer units and α-olefin monomer units having 4 to 10 carbon atoms, for example consisting of at least 80.0 wt % of propylene monomer units and at most 20.0 wt % of the comonomer units, at least 90.0 wt % of propylene monomer units and at most 10.0 wt % of the comonomer units or at least 95.0 wt % of propylene monomer units and at most 5.0 wt % of the comonomer units, based on the total weight of the propylene-based matrix.

Preferably, the comonomer in the propylene copolymer of the propylene-based matrix is selected from the group of ethylene, 1-butene, 1-pentene, 4-methyl-1-pentene, 1-hexen, 1-heptene and 1-octene, and is preferably ethylene.

Preferably, the propylene-based matrix consists of a propylene homopolymer. The fact that the propylene-based matrix consists of a propylene homopolymer is advantageous in that a higher stiffness is obtained compared to the case where the propylene-based matrix is a propylene copolymer.

The melt flow index (MFI) of the propylene-based matrix (before the heterophasic propylene copolymer is mixed into the composition of the invention), $MFI_{PP}$, may be for example at least 0.10 dg/min, at least 0.20 dg/min, at least 0.30 dg/min, at least 0.50 dg/min, at least 1.0 dg/min, at least 1.5 dg/min, and/or for example at most 50.0 dg/min, at most 40.0 dg/min, at most 30.0 dg/min, at most 25.0 dg/min, at most 20.0 dg/min, measured according to ISO1133 (2.16 kg/230° C.). The $MFI_{PP}$ may be in the range of for example 0.10 to 50.0 dg/min, for example from 0.20 to 40.0 dg/min, for example 0.30 to 30.0 dg/min, for example 0.50 to 25.0 dg/min, for example from 1.0 to 20.0 dg/min, for example from 1.5 to 10.0 dg/min, measured according to ISO1133 (2.16 kg/230° C.).

The propylene-based matrix is present in an amount of 60.0 to 95.0 wt %. Preferably, the propylene-based matrix is present in an amount of 60.0 to 80.0 wt %, for example at least 65.0 wt % or at least 70.0 wt % and/or at most 78.0 wt %, based on the total heterophasic propylene copolymer.

The propylene-based matrix is preferably semi-crystalline, that is it is not 100% amorphous, nor is it 100% crystalline. For example, the propylene-based matrix is at least 40% crystalline, for example at least 50%, for example at least 60% crystalline and/or for example at most 80% crystalline, for example at most 70% crystalline. For example, the propylene-based matrix has a crystallinity of 60 to 70%. For purpose of the invention, the degree of crystallinity of the propylene-based matrix is measured using differential scanning calorimetry (DSC) according to ISO11357-1 and ISO11357-3 of 1997, using a scan rate of 10° C./min, a sample of 5 mg and the second heating curve using as a theoretical standard for a 100% crystalline material 207.1 J/g.

Besides the propylene-based matrix, the heterophasic propylene copolymer also comprises a dispersed ethylene-α-olefin copolymer. The dispersed ethylene-α-olefin copolymer is also referred to herein as the 'dispersed phase'. The dispersed phase is embedded in the heterophasic propylene copolymer in a discontinuous form. The particle size of the dispersed phase is typically in the range of 0.05 to 2.0 microns, as may be determined by transmission electron microscopy (TEM). The amount of the dispersed ethylene-α-olefin copolymer in the heterophasic propylene copolymer may herein be sometimes referred as RC.

The amount of ethylene monomer units in the ethylene-α-olefin copolymer is 10.0 to 70.0 wt %, for example at least 20.0 wt %, at least 30.0 wt % or at least 40.0 wt % and/or at most 65.0 wt % or at most 60.0 wt %. The amount of ethylene monomer units in the dispersed ethylene-α-olefin copolymer in the heterophasic propylene copolymer may herein be sometimes referred as RCC2.

The α-olefin in the ethylene-α-olefin copolymer is preferably chosen from the group of α-olefins having 3 to 8 carbon atoms. Examples of suitable α-olefins having 3 to 8 carbon atoms include but are not limited to propylene, 1-butene, 1-pentene, 4-methyl-1-pentene, 1-hexen, 1-heptene and 1-octene. More preferably, the α-olefin in the ethylene-α-olefin copolymer is chosen from the group of α-olefins having 3 to 4 carbon atoms and any mixture thereof, more preferably the α-olefin is propylene, in which case the ethylene-α-olefin copolymer is ethylene-propylene copolymer.

The MFI of the dispersed ethylene α-olefin copolymer (before the heterophasic propylene copolymer is mixed into the composition of the invention), MFIrubber, may be for example at least 0.001 dg/min, at least 0.01 dg/min, at least 0.10 dg/min, at least 0.30 dg/min, at least 0.70 dg/min, at least 1.0 dg/min, and/or for example at most 30.0 dg/min, at most 20.0 dg/min, at most 15.0 dg/min at most 10.0 dg/min, at most 5.0 dg/min or at most 3.0 dg/min. The MFIrubber may be in the range for example from 0.001 to 30.0 dg/min, for example from 0.01 to 20.0 dg/min, for example 0.10 to 15.0 dg/min, for example 0.30 to 10.0 dg/min, for example from 0.70 to 5.0 dg/min, for example from 1 to 3 dg/min. MFIrubber is calculated according to the following formula:

$$MFIrubber = 10 \wedge \left( \frac{MFIheterophasic - \text{matrix content} * LogMFImatrix}{\text{rubber content}} \right)$$

wherein
MFIheterophasic is the MFI (dg/min) of the heterophasic propylene copolymer measured according to ISO1133 (2.16 kg/230° C.),
MFImatrix is the MFI (dg/min) of the propylene-based matrix measured according to ISO1133 (2.16 kg/230° C.),
matrix content is the amount (wt %) of the propylene-based matrix in the heterophasic propylene copolymer,
rubber content is the amount (wt %) of the dispersed ethylene-α-olefin copolymer in the heterophasic propylene copolymer. For the avoidance of any doubt, Log in the formula means $\log_{10}$.

The dispersed ethylene-α-olefin copolymer is present in an amount of 40.0 to 5.0 wt %. Preferably, the dispersed ethylene-α-olefin copolymer is present in an amount of 40.0 to 20.0 wt %, for example in an amount of at least 22.0 wt % and/or for example in an amount of at most 35.0 wt % or at most 30.0 wt % based on the total heterophasic propylene copolymer.

In the heterophasic propylene copolymer in the composition of the invention, the sum of the total weight of the propylene-based matrix and the total weight of the dispersed ethylene-α-olefin copolymer is 100.0 wt % of the heterophasic propylene copolymer.

Preferably, the heterophasic propylene copolymer has a fraction soluble in p-xylene at 25° C. (CXS) measured according to ISO 16152:2005 of 40.0 to 5.0 wt %. More preferably, the heterophasic propylene copolymer has CXS of 40.0 to 20.0 wt %, for example in an amount of at least 22.0 wt % and/or for example in an amount of at most 35.0 wt % or at most 30.0 wt %.

Preferably, the amount of ethylene monomer units in the heterophasic propylene copolymer (sometimes referred as TC2) is in the range of 3.0 to 20.0 wt %, for example 5.0 to 15.0 wt %, based on the heterophasic propylene copolymer.

The MFI of the heterophasic propylene copolymer may be for example at least 0.10 dg/min, at least 0.20 dg/min, at least 0.30 dg/min, at least 0.50 dg/min, at least 1.0 dg/min at least 1.5 dg/min, at least 5.0 dg/min, at least 10.0 dg/min, at least 20.0 dg/min, at least 30.0 dg/min, at least 40.0 dg/min, and/or for example at most 100.0 dg/min, at most 90.0 dg/min, at most 80.0 dg/min, at most 70.0 dg/min, at most 60.0 dg/min or at most 50.0 dg/min measured according to ISO1133 (2.16 kg/230° C.). In some embodiments, the MFI of the heterophasic propylene copolymer may be in the range of 10.0 to 100.0 dg/min, for example 30.0 to 80.0 dg/min, measured according to ISO1133 (2.16 kg/230° C.). Such a range of MFI is suitable for injection moulding.

The values of the MFI of the propylene-based matrix ($MFI_{PP}$) and the MFI of the dispersed ethylene-α-olefin elastomer ($MFI_{EPR}$) mentioned herein are understood as the values before the heterophasic propylene copolymer is mixed with other components to obtain the composition according to the invention. The value of the MFI of the heterophasic propylene copolymer (MFI heterophasic) refers to the final MFI of the heterophasic propylene copolymer. To exemplify this:

In case the heterophasic propylene copolymer is not subjected to vis-breaking or shifting by melt-mixing with a peroxide, the MFIheterophasic is the original MFI value of the heterophasic propylene copolymer. In case the heterophasic propylene copolymer is subjected to vis-breaking or shifting by melt-mixing with a peroxide, the MFIheterophasic is the value of the heterophasic propylene copolymer after such vis-breaking or shifting.

The amount of the heterophasic propylene copolymer may e.g. be 20.0 to 80.0 wt % with respect to the total composition according to the invention.

In some embodiments, a) and b) consists of the heterophasic propylene copolymer.

In some embodiments, a) and b) comprises the heterophasic propylene copolymer and a) further comprises the propylene homopolymer and/or the propylene copolymer added as a separate component from the heterophasic propylene copolymer and/or b) further comprises the ethylene-α-olefin copolymer added as a separate component from the heterophasic propylene copolymer. Preferably, the amount of b) with respect to the total of a) and b) is 10.0 to 40.0 wt %, 20.0 to 40.0 wt % or 30.0 to 40.0 wt %.

In some embodiments, a) and b) are added as separate components from each other.

In some embodiments, the composition does not comprise b).

Suitable examples of component a) added separately from component b) are the materials of the propylene-based matrix described in relation to the heterophasic propylene copolymer.

Component b) added separately from component a) may be the materials of the dispersed phase described in relation to the heterophasic propylene copolymer. In preferred embodiments, component b) is an elastomer of ethylene and α-olefin comonomer having 4 to 8 carbon atoms. The α-olefin comonomer in the elastomer is preferably an acyclic monoolefin such as 1-butene, 1-pentene, 1-hexene, 1-octene, or 4-methylpentene. Accordingly, the elastomer is preferably selected from the group consisting of ethylene-1-butene copolymer, ethylene-1-hexene copolymer, ethylene-1-octene copolymer and mixtures thereof.

Preferably, the elastomer has a density of 0.850 to 0.915 g/cm$^3$. For example, the density of the elastomer is at least 0.850 g/cm$^3$, for example at least 0.865 g/cm$^3$, for example at least 0.880 g/cm$^3$, for example at least 0.900 g/cm$^3$ and/or for example at most 0.915 g/cm$^3$, for example at most 0.910 g/cm$^3$, for example at most 0.907 g/cm$^3$, for example at most 0.906 g/cm$^3$. More preferable the density of the elastomer is 0.880 to 0.907 g/cm$^3$, most preferably, the density of the elastomer is 0.900 to 0.906 g/cm$^3$.

Elastomers which are suitable for use in the current invention are commercially available for example under the trademark EXACT™ available from Exxon Chemical Company of Houston, Tex. or under the trademark ENGAGE™ polymers, a line of metallocene catalyzed plastomers available from Dow Chemical Company of Midland, Michigan or from Nexlene™ from SK Chemicals The elastomers may be prepared using methods known in the art, for example by using a single site catalyst, i.e., a catalyst the transition metal components of which is an organometallic compound and at least one ligand of which has a cyclopentadienyl anion structure through which such ligand bondingly coordinates to the transition metal cation. This type of catalyst is also known as "metallocene" catalyst. Metallocene catalysts are for example described in U.S. Pat. Nos. 5,017,714 and 5,324,820. The elastomers may also be prepared using traditional types of heterogeneous multi-sited Ziegler-Natta catalysts.

Preferably, the elastomer has a melt flow index of 0.10 to 40.0 dg/min (ISO1133, 2.16 kg, 190° C.), for example at least 1.0 dg/min and/or at least 35.0 dg/min. More preferably, the elastomer has a melt flow index of at least 1.5 dg/min, for example of at least 2.0 dg/min, for example of at least 2.5 dg/min, for example of at least 3.0 dg/min, more preferably at least 5.0 dg/min, preferably at least 10.0 dg/min, more preferably at least 20.0 dg/min, measured in accordance with ISO 1133 using a 2.16 kg weight and at a temperature of 190° C. In these ranges, particularly good stress whitening property is obtained.

Preferably, the amount of ethylene in the elastomer is at least 50.0 mol %. More preferably, the amount of ethylene in the elastomer is at least 57.0 mol %, for example at least 60.0 mol %, at least 65.0 mol % or at least 70.0 mol %. Even more preferably, the amount of ethylene in the elastomer is at least 75.0 mol %. In these ranges, particularly good transparency (and low haze) is obtained. The amount of ethylene in the elastomer may typically be at most 97.5 mol %, for example at most 95.0 mol % or at most 90.0 mol %.

In some embodiments, the amount of b) with respect to the total of a) and b) is 0 to 40.0 wt %, for example 10.0 to 40.0 wt %, 20.0 to 40.0 wt % or 30.0 to 40.0 wt %; or 0 to 30.0 wt %, 0 to 20.0 wt %, 0 to 10.0 wt % or 0 to 5.0 wt % or 0 wt %. When the amount of b) with respect to the total of a) and b) is high, the composition generally has a higher impact strength. When the amount of b) with respect to the total of a) and b) is low, the composition generally has a higher stiffness.

In some embodiments, the invention provides an instrumental panel carrier comprising the composition according to the invention, wherein the amount of b) with respect to the total of a) and b) is 10.0 to 40.0 wt %, 20.0 to 40.0 wt % or 30.0 to 40.0 wt %. The impact strength ensured by the higher amount of b) is suitable for an instrumental panel carrier.

In some embodiments, the invention provides a tailgate comprising the composition according to the invention, wherein the amount of b) with respect to the total of a) and b) is 0 to 30.0 wt %, 0 to 20.0 wt %, 0 to 10.0 wt %, 0 to 5.0 wt % or 0 wt %. The high stiffness ensured by the low amount of b) is suitable for a tailgate.

The total amount of a) and b) with respect to the total composition is 10.0 to 80.0 wt %, for example 20.0 to 80.0 wt %. Preferably, the total amount of a) and b) with respect to the total composition is 10.0 to 50.0 wt % c) Glass Fibers

The composition according to the invention comprises glass fibers.

The glass fibers, as added to the composition, can comprise long and/or short glass fibers. Short glass fibers may have an average length of less than 4.0 mm before being added to the composition. After processing, the short glass fibers in the composition may have an average length of up to 1.0 mm. Long glass fibers may have an average length of at least 4.0 mm before being added to the composition. After processing, the long glass fibers in the composition may have an average length of 1.5 to 3.0 mm, for example 2.0 to 2.5 mm.

The diameter of the glass fibers can be 5.0 to 50.0 micrometers, specifically, 8.0 to 30.0 micrometers, more specifically, 10.0 to 20.0 micrometers.

The lengths and the diameters of the glass fibers can be determined based on the photo images by an image analysis software. The term "average" refers to an arithmetic average.

The glass fiber can be a coated glass fiber and can be prepared from continuous lengths of fibers by, for example, a sheathing or wire-coating process, by crosshead extrusion, or by a pultrusion technique. Using these technologies, fiber strands impregnated or coated with a polymer are formed. The fiber can then be cut into a desired length and can optionally be formed into pellets or granules. The fibers can be further processed, e.g. by injection moulding or extrusion processes, into a composition.

The amount of the glass fibers is 5.0 to 50.0 wt %, preferably 10.0 to 50.0 wt %, for example 20.0 to 45.0 wt %, with respect to the total composition according to the invention. The amount of the glass fibers may e.g. be at least 25.0 wt %, at least 30.0 wt % or at least 35.0 wt % with respect to the total composition according to the invention.

d) Reaction Product of d1) Functionalized Polypropylene and d2) Polyetheramine d1) Functionalized Polypropylene Functionalized polypropylene is a polypropylene onto which a monomer has been grafted. The usual method of such grafting is by free radical reaction. In the practice of this invention, the maleated polypropylene is not a copolymer of maleic anhydride or equivalent thereof, and propylene, such that the maleic anhydride moiety is predominantly in the backbone of the copolymer. Suitable monomers for preparing functionalized polypropylene are, for example, olefinically unsaturated monocarboxylic acids of less than 12 carbon atoms, e.g., acrylic acid or methacrylic acid, and the corresponding tert-butyl esters, e.g., tert-butyl (meth)acrylate, olefinically unsaturated dicarboxylic acids of less than 12 carbon atoms, e.g., fumaric acid, maleic acid, and itaconic acid and the corresponding mono-and/or di-tert-butyl esters, e.g., mono- or di-tert-butyl fumarate and mono- or di-tert-butyl maleate, olefinically unsaturated dicarboxylic anhydrides of less than 12 carbon atoms, e.g., maleic anhydride, sulfo- or sulfonyl-containing olefinically unsaturated monomers of less than 12 carbon atoms, e.g., p-styrenesulfonic acid, 2-(meth)acrylamide-2-methylpropenesulfonic acid or 2-sulfonyl(meth)acrylate, oxazolinyl-containing olefinically unsaturated monomers of less than 12 carbon atoms, e.g., vinyloxazolines and vinyloxazoline derivatives, and epoxy-containing olefinically unsaturated monomers of less than 12 carbon atoms, e.g., glycidyl (meth)acrylate or allyl glycidyl ether. The most preferred monomer for preparing functionalized polypropylene is maleic anhydride.

The functionalized polypropylene used in the practice of this invention may have a wide variety of number average molecular weights. The number average molecular weight may e.g. be 40,000 to 60,000. Generally, glass filler and polypropylene are not miscible, and their combination commonly leads to voids in the resulting compositions. The relatively higher molecular weight materials "wet" the glass to make the glass filler particles and polypropylene more combinable to thereby decrease the amount of voids in the resulting compositions.

Suitable anhydride functionalized polypropylene include the following structures:

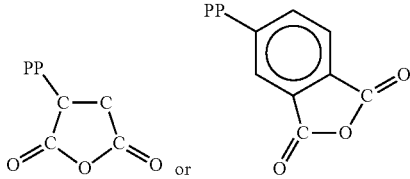

wherein PP is polypropylene. In these structures, it should be appreciated that the polypropylene can be bonded to one or two monomers when the polypropylene is linear, while more than two monomers might be included when the propylene is branched. Typically, one or two monomers are present.

Preferred anhydride functionalized polypropylene is:

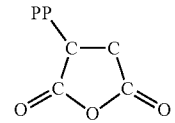

wherein PP is polypropylene.

A representative example of a maleated polypropylene that is currently commercially available is under the name Exxelor 1020 available from ExxonMobil.

The amount of d1) is 10.0 to 50.0 wt %, preferably 30.0 to 50.0 wt %, with respect to the total composition.

d2) Polyetheramine

Examples of polyetheramines include monamines, diamines and triamines. Preferred polyetheramines have a molecular weight of from about 150 to about 12,000, for example from about 1,000 to about 3,000.

Examples of monoamines include JEFFAMINE M-1000, JEFFAMINE M-2070, and JEFFAMINE M-2005.

Preferred polyetheramines are diamines and triamines and combination of a diamine and a triamine. Most preferably, the polyetheramine is a diamine.

Suitable diamines include JEFFAMINE ED-6000, JEFFAMINE ED-4000, JEFFAMINE ED-2001, JEFFAMINE D-2000, JEFFAMINE D-4000, JEFFAMINE ED-900, JEFFAMINE ED-600, and JEFFAMINE D-400.

Suitable triamines include JEFFAMINE ET-3000, JEFFAMINE T-3000 and JEFFAMINE T-5000.

The structures of these examples of suitable polyetheramines are known and can be found e.g. on columns 25-26 of U.S. Pat. No. 5,783,630, incorporated herein by reference.

More preferred polyetheramines of the present invention have a molecular weight in the range from about 1500 to about 2000.

Suitable polyether blocks for the polyetheramine include polyethylene glycol, polypropylene glycol, copolymers of polyethylene glycol and polypropylene glycol, poly(1,2-butylene glycol), and poly(tetramethylene glycol). The glycols can be aminated using well known methods to produce the polyetheramines. Generally, the glycols are prepared from ethylene oxide, propylene oxide or combination thereof using well known methods such as by a methoxy or hydroxy initiated reaction. When both ethylene oxide and propylene oxide are used, the oxides can be reacted simultaneously when a random polyether is desired, or reacted sequentially when a block polyether is desired.

In one embodiment of the present invention, the polyetheramines are prepared from ethylene oxide, propylene oxide or combinations thereof. Generally, when the polyetheramine is prepared from ethylene oxide, propylene oxide or combinations thereof, the amount of ethylene oxide on a molar basis is greater than about 50.0 percent of the polyetheramine, preferably greater than about 75.0 percent and more preferably greater than about 90.0 percent. In one embodiment of this invention, polyols and amines including polyalkylene polyamines and alkanol amines or any amine that is not a polyetheramine as disclosed herein may be absent from the composition. Similarly, functional groups other than ether linkages and amine groups may be absent from the polyetheramine. The polyether amines used in the practice of this invention can be prepared using well known amination techniques such as described in U.S. Pat. No. 3,654,370. Generally, the polyether amines are made by aminating a polyol, such as a polyether polyol with ammonia in the presence of a catalyst such as a nickel containing catalyst such as a Ni/Cu/Cr catalyst.

The mixing of the functionalized PP and polyetheramine to obtain their reaction product may be carried out in a customary mixing apparatus including batch mixers, continuous mixers, kneaders, and extruders. For most applications, the preferred mixing apparatus is an extruder.

It is contemplated that the polyetheramine and functionalized polypropylene, and optionally a small amount of a) and/or b), can be reacted to form a reaction product concentrate and, later, the reaction product concentrate can be blended with the remaining components. In this aspect of the invention, the polyetheramine comprises from about 10.0 to about 50.0 weight percent of the concentrate. When the reaction product of polyether amine and maleated PP is prepared neat, the reaction product can be blended or compounded with a) and/or b) and any other components of the desired composition to the desired levels using a mixing apparatus such as an extruder.

Depending on the type of mixer, the reaction product, polypropylene and any other components can be thoroughly mixed as solids prior to introducing the admixture in the mixing apparatus. Alternatively, mixers are available which will mix the components during operation. In either case, during operation of the mixer, the components are heated to melt the solids, with the melted components being thereafter mixed to form the final composition.

The preferred reaction product between maleated polypropylene d1) and the preferred polyetheramine d2) has one of the following formulas (i)-(iv):

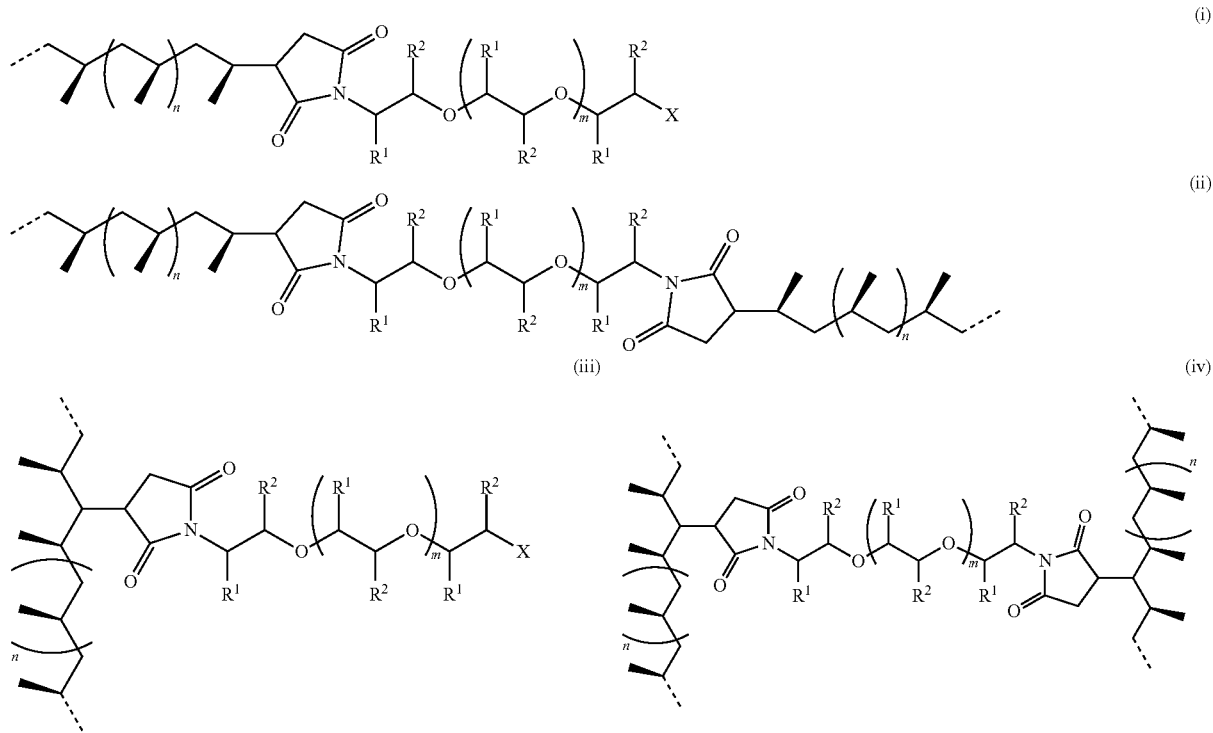

wherein n is 5 to 50000 and m is 3 to 100,
wherein $R^1$=H and $R^2$=H, $R^1$=H and $R^2$=$CH_3$ or $R^1$=$CH_3$ and $R^2$=$CH_3$, and
wherein X is selected from the group consisting of —OH, —$OCH_3$, —$CH_2C(R^1)HNH_2$.

The amount of d2) is at least 5.0 wt % with respect to the total composition. Preferably, the amount of d2) is at least 10.0 wt %, for example 11.0 to 30.0 wt %, with respect to the total composition. This was found to result in a higher bonding strength. When the amount of d2) is too large, the processability of the composition may decrease.

The weight ratio of d2) to d1) is at least 0.050. Preferably, the weight ratio of d2) to d1) is at least 0.10, at least 0.15 or at least 0.20, for example 0.25 to 1.0. This was found to result in a higher bonding strength.

Preferably, the weight ratio of d2) to the sum of a), b) and d1) is 0.050 to 1.0.

Preferably, the weight ratio of d1) to the sum of a), b) and d1) is 0.10 to 5.0.

Preferably, the sum of a), b), c) and d) is at least 90.0 wt %, at least 95.0 wt %, at least 98.0 wt %, at least 99.0 wt % or 100 wt % of the total composition.

e) Additives

The composition according to the invention may further comprise optional components different from the previously mentioned components of the composition, such as additives, wherein the total of these components (the previously mentioned components of the composition and the optional components) is 100 wt % of the total composition. Accordingly, the invention relates to a composition consisting of these components.

The additives may include nucleating agents, stabilisers, e.g. heat stabilisers, anti-oxidants, UV stabilizers; colorants, like pigments and dyes; clarifiers; surface tension modifiers; lubricants; flame-retardants; mould-release agents; flow improving agents; plasticizers; anti-static agents; and/or blowing agents.

The skilled person can readily select any suitable combination of additives and additive amounts without undue experimentation. The amount of the additives depends on their type and function and typically is of 0 to about 10.0 wt %, for example 0.10 to 5.0 wt % or 1.0 to 3.0 wt %, based on the composition.

LGF/Heterophasic Propylene Copolymer Compositions

In some preferred embodiments, the glass fibers are long glass fibers having an average length of at least 4.0 mm before being added to the composition and the composition comprises a heterophasic propylene copolymer consisting of a1) a matrix and b1) a dispersed phase, wherein a) comprises a1) and b) comprises b1) and. Preferably, the amount of the glass fibers in these embodiments is at least 20.0 wt %, at least 25.0 wt %, at least 30.0 wt % or at least 35.0 wt %, with respect to the composition.

These embodiments are advantageous in that the composition has the right balance of mechanical properties needed for injection molded parts which are specially designed for structural parts such as an instrumental panel carrier. The long glass fibers give a high stiffness and the heterophasic propylene copolymer gives sufficient impact performance and control of the dimension stability.

LGF/Homopolymer Compositions

In some preferred embodiments, the glass fibers are long glass fibers having an average length of at least 4.0 mm before being added to the composition and the amount of b) with respect to the total of a) and b) is 0 to 30.0 wt %, 0 to 20.0 wt %, 0 to 10.0 wt % or 0 to 5.0 wt % or 0 wt % and. Preferably, the amount of the glass fibers in these embodiments is at least 20.0 wt %, at least 25.0 wt %, at least 30.0 wt % or at least 35.0 wt %, with respect to the composition.

These embodiments are advantageous in that the composition has the right balance of mechanical properties for a tailgate.

In preferred embodiments where the glass fibers are long glass fibers, the composition comprises as components a), b) and c) a long glass fibre-reinforced thermoplastic polymer composition prepared by a process comprising the subsequent steps of: unwinding from a package of at least one continuous glass multifilament strand; applying an impregnating agent to said at least one continuous glass multifilament strand to form an impregnated continuous multifilament strand, applying a sheath of a thermoplastic polymer around the impregnated continuous multifilament strand to form a sheathed continuous multifilament strand and cutting the sheathed continuous glass multifilament strand into pellets having lengths of at least 4.0 mm. Such glass fibre-reinforced thermoplastic polymer compositions are described in detail e.g. in WO2009080281. The thermoplastic polymer is components a) and b).

SGF/Homopolymer Compositions

In some preferred embodiments, the glass fibers are short glass fibers having an average length of less than 4.0 mm before being added to the composition and the amount of b) with respect to the total of a) and b) is 0 to 30.0 wt %, 0 to 20.0 wt %, 0 to 10.0 wt % or 0 to 5.0 wt % or 0 wt %. Preferably, the amount of the glass fibers in these embodiments is at least 20.0 wt %, at least 25.0 wt %, at least 30.0 wt % or at least 35.0 wt %, with respect to the composition.

These embodiments are advantageous in that the composition has the right balance of mechanical properties for a door handle and a tailgate, particularly a door handle. The short glass fibers give a high stiffness and control of the dimension stability.

Process for Making Composition

The composition of the invention may be obtained by a process comprising melt-mixing the component by using any suitable means. Accordingly, the invention further relates to a process for the preparation of the composition according to the invention comprising melt mixing the components. Preferably, the composition of the invention is made in a form that allows easy processing into a shaped article in a subsequent step, like in pellet or granular form. The composition can be a mixture of different particles or pellets; like a blend of the heterophasic propylene copolymer and a masterbatch of additives and other components. Preferably, the composition of the invention is in pellet or granular form as obtained by mixing all components in an apparatus like an extruder; the advantage being a composition with homogeneous and well-defined concentrations of the additives.

With melt-mixing is meant that the components are mixed at a temperature that exceeds the melting point of components a) and b). Melt-mixing may be done using techniques known to the skilled person, for example in an extruder. Generally, in the process of the invention, melt-mixing is performed at a temperature in the range from 2-300° C.

Suitable conditions for melt-mixing, such as temperature, pressure, amount of shear, screw speed and screw design when an extruder is used are known to the skilled person.

When using an extruder, a conventional extruder such as a twin-screw extruder may be used. The temperature can vary through the different zones of the extruder as required. For example, the temperature may vary from 100° C. in the feed zone to 300° C. at the die. Preferably, the temperature in the extruder varies from 200 to 265° C.; lower temperatures may impede reactions between the peroxide and an optional co-agent, for example polyfunctional monomers such as BDDMA and, as a consequence, compositions with the desired melt flow index may not be obtained; too high temperatures may induce undesired degradation processes, which may for example result in compositions having poor mechanical properties. Likewise, the screw speed of the extruder may be varied as needed. Typical screw speed is in the range from about 100 rpm to about 400 rpm.

The invention further provides an automotive body part comprising the composition according to the invention.

The invention further provides use of the composition according to the invention for making an automotive body part.

The invention further provides use of the composition according to the invention for making an instrumental panel carrier, wherein preferably the amount of b) with respect to the total of a) and b) is 10.0 to 40.0 wt %, 20.0 to 40.0 wt % or 30.0 to 40.0 wt %.

The invention further provides use of the composition according to the invention for making a tailgate, wherein preferably the amount of b) with respect to the total of a) and b) is 0 to 30.0 wt %, 0 to 20.0 wt %, 0 to 10.0 wt %, 0 to 5.0 wt % or 0 wt %.

Bonding Process

The invention further provides a process for adhering a first part and a second part, comprising the steps of:
i) molding a first part from a first composition, wherein the first composition is the composition according to the invention,
ii) optionally performing a surface treatment on the surface of the first part by plasma or flame,
iii) optionally applying a primer on the surface of the first part and
iv) pressing the first part and the second part together with an adhesive inbetween.

The second part may be molded from a second composition comprising a thermoplastic resin. This is particularly suitable for making structural and aesthetical subsystems for a tailgate from the first part and the second part. The thermoplastic resin of the second composition may be polypropylene. In addition to polypropylene, the second composition may further comprise talc and/or glass fibers. The glass fibers may be long glass fibers and/or short glass fibers. Preferably, the second composition is also the composition according to the invention. The first composition and the second composition may be the same or different. Another typical example of the thermoplastic resin of the second composition is polycarbonate. In addition to polycarbonate, the second composition may further comprise acrylonitrile butadiene styrene (ABS), polyethylene terephthalate (PET) and/or polybutylene terephthalate (PBT).

The second part may be a sheet (skin) made of real leather or artificial leather (made e.g. by PVC). This is particularly suitable when the first part is an instrumental panel carrier.

In some embodiments, the process comprises step ii) performing a surface treatment on the surface(s) of the first part by plasma or flame. The presence of this step in the process improves the bonding strength. In case the second part is molded from a second composition comprising polypropylene and the second composition is not the composition according to the invention, a surface treatment is performed on the surface of the second part by plasma or flame. Prior to the surface treatment, the surface to be treated is preferably cleaned to remove contaminant. The cleaning is preferably performed if there is storage time between the molding and the surface treatment. Cleaning methods are known, for example cleaning by hand with isopropyl alcohol wipes; a power-wash cleaning involving the application of hot water with soap, rinsing and drying; and $CO_2$ snow cleaning.

In some embodiments, the process does not comprise step ii) performing a surface treatment on the surface of the first part by plasma or flame. The absence of this step in the process leads to a simplification of the process.

In some embodiments, the process comprises iii) applying a primer on the surface of the first part. Suitable types of the primer are known, for example a polyisocyanate primer.

In some embodiments, the process does not comprise iii) applying a primer on the surface of the first part.

The process comprises iv) applying an adhesive on the surface(s) of the first part and/or the second part and bonding the first part and the second part together. Suitable types of the adhesive are known, for example polyurethane.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

The invention is now elucidated by way of the following examples, without however being limited thereto.

EXAMPLES

Ex 3 to Ex 8

A reaction product of PP-maleic anhydride and polyetheramine was prepared in a twin screw extruder by adding the PP-MA as granules in the throat of the extruder and the amine-PEG-amine Jeffamine D-2000) as a liquid downstream of the extruder and then thoroughly mixing/dispersing it into a homogenous pre-compound blend.

This reaction product was dry blended with PP-LGF granules (comprising heteophasic propylene copolymer 1, propylene homopolymer 1 and glass fibers) and compounded in a twin screw extruder. The components of the composition are shown in Table 1. The compositions of the obtained compounds are shown in Table 2.

After drying, the obtained compound was injection molded into lap shear test bars, glued to each other using 1K polyurethane glue and tested according to test method DIN EN 1465. Where indicated, the surfaces of the bars were cleaned with isopropanol, flamed and provided with a polyisocyanate primer.

CEx 1 and CEx

The process was identical to Ex 3 to Ex 8 except that PP-MA was dry blended with PP-LGF granules instead of the reaction product of PP-MA and polyetheramine.

| | |
|---|---|
| heterophasic propylene copolymer 1 | matrix = propylene homopolymer (81 wt %), dispersed phase = ethylene-propylene copolymer (19 wt %), TCC2 = 10 wt %, MFI = 70 dg/min (ISO1133, 2.16 kg/230° C.) |
| propylene homopolymer 1 | MFI = 15 dg/min (ISO1133, 2.16 kg/230° C.) |
| glass fibers 1 | diameter 19 µm (LGF SE4220) |
| functionalized polypropylene 1 | polypropylene grafted with maleic anhydride (Exxelor 1020) |
| polyetheramine 1 | diamine (Jeffamine D-2000) |

TABLE 2

|  | CEx 1 | CEx 2 | Ex 3 | Ex 4 | Ex 5 | Ex 6 | Ex 7 | Ex 8 |
|---|---|---|---|---|---|---|---|---|
| heteophasic propylene copolymer 1 | 76.46 | 76.46 | 38.23 | 38.23 | 38.23 | 38.23 | 38.23 | 38.23 |
| propylene homopolymer 1 | 0.13 | 0.13 | 0.07 | 0.07 | 0.07 | 0.07 | 0.07 | 0.07 |
| glass fibers 1 | 20.1 | 20.1 | 10.05 | 10.05 | 10.05 | 10.05 | 10.05 | 10.05 |
| functionalized polypropylene 1 | 1 | 1 | 39.39 | 39.39 | 39.39 | 43.69 | 43.69 | 43.69 |
| polyetheramine | 0 | 0 | 11.1 | 11.1 | 11.1 | 6.8 | 6.8 | 6.8 |
| additives | 2.31 | 2.31 | 1.16 | 1.16 | 1.16 | 1.16 | 1.16 | 1.16 |
| Total | 100 | 100 | 100 | 100 | 100 | 100 | 100 | 100 |
| Ratio Jeff/PP-MA | 0 | 0 | 0.28 | 0.28 | 0.28 | 0.16 | 0.16 | 0.16 |
| Rubber content | 14.5 | 14.5 | 7.3 | 7.3 | 7.3 | 7.3 | 7.3 | 7.3 |
| IPA wash | Y | Y | N | Y | N | N | Y | N |
| surface treatment | N | Y | N | N | Y | N | N | Y |
| Lap shear test DIN EN 1465 initial (no ageing) [MPa] | 0.46 | 5.28 | 2.36 | 3.25 | 4.23 | 0.73 | 1.58 | 3.53 |
| type of failure | AF | SCF | SCF/AF | SCF/AF | CF/SCF | AF | AF | CF/SCF |

AF = adhesive type of failure
SCF = cohesive type of failure

It can be understood that the reaction product of PP-maleic anhydride and polyetheramine improves the bonding strength.

Further, each of the IPA wash and the surface treatment results in an increase in the bonding strength.

Further, a higher ratio of polyetheramine to PP-maleic anhydride results in an increase in the bonding strength.

The invention claimed is:

1. A composition comprising
   a) a propylene homopolymer and/or a propylene copolymer consisting of at least 70.0 wt % of propylene monomer units and at most 30.0 wt % of comonomer units selected from ethylene monomer units and α-olefin monomer units having 4 to 10 carbon atoms,
   b) an optional ethylene-α-olefin copolymer,
   c) glass fibers and
   d) a reaction product of d1) a functionalized polypropylene and d2) a polyetheramine, wherein the total amount of a) and b) is 10.0 to 80.0 wt % with respect to the total composition,
   the amount of c) is 5.0 to 50.0 wt % with respect to the total composition,
   the amount of d1) is greater than or equal to 39.39 wt % and less than or equal to 45 wt %, with respect to the total composition,
   the amount of d2) is at least 5 wt % with respect to the total composition and the weight ratio of d2) to d1) is 0.25 to 1.00,
   wherein the composition comprises a heterophasic propylene copolymer consisting of a1) a matrix and b1) a dispersed phase, wherein a) comprises a1) and b) comprises b1).

2. The composition according to claim 1, wherein d1) is an anhydride functionalized polypropylene.

3. The composition according to claim 1, wherein d) has one of the following formulas (i)-(iv):

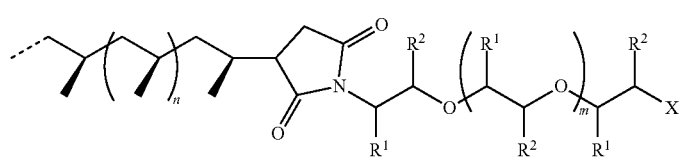

(i)

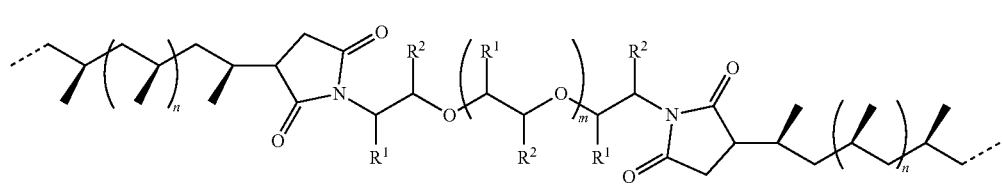

(ii)

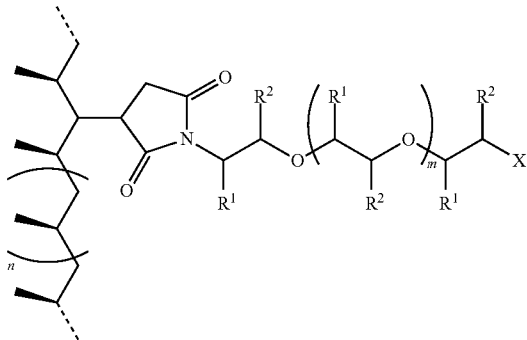
(iii)

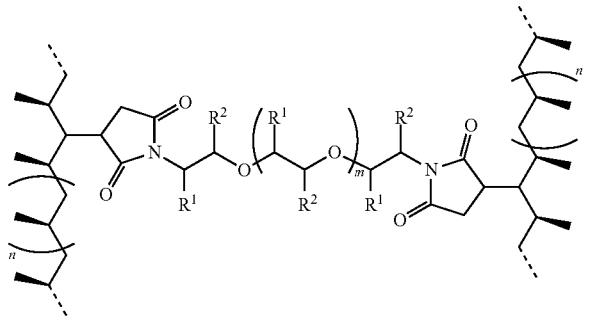
(iv)

wherein n is 5 to 50000 and m is 3 to 100,
wherein $R^1$=H and $R^2$=H, $R_1$=H and $R^2$=$CH_3$ or $R^1$=$CH_3$ and $R^2$=$CH_3$, and
wherein X is selected from the group consisting of —OH, —$OCH_3$, —$CH_2C(R^1)HNH_2$.

4. The composition of claim 1, wherein the amount of d2) is at least 10.0 wt % with respect to the total composition.

5. The composition according to claim 1, wherein
the amount of a1) is 60.0 to 95.0 wt % based on the total of a1) and b1) and the amount of b1) is 5.0 to 40.0 wt % based on the total of a1) and b1),
the amount of ethylene monomer units in b1) is 10.0 to 70.0 wt %, and/or
the heterophasic propylene copolymer has a melt flow index of 10.0 to 100.0 dg/min measured according to ISO1133 (2.16 kg/230° C.).

6. The composition according to claim 1, wherein the amount of b) with respect to the total of a) and b) is 10.0 to 40.0 wt %.

7. The composition according to claim 1, wherein the glass fibers are long glass fibers having an average length of at least 4.0 mm before being added to the composition.

8. The composition according to claim 1, wherein the amount of b) with respect to the total of a) and b) is 0 to 30.0 wt %.

9. The composition of claim 8, wherein the glass fibers are short glass fibers having an average length of less than 4.0 mm before being added to the composition.

10. A tailgate or a door handle comprising the composition according to claim 9.

11. The composition according to claim 9, wherein the amount of the glass fibers is at least 20.0 wt % with respect to the composition.

12. An automotive body part comprising the composition according to claim 9.

13. An automotive body part comprising the composition according to claim 1.

14. An instrumental panel carrier comprising the composition according to claim 1.

15. The composition according to claim 1, wherein d1) is maleic anhydride functionalized polypropylene.

16. The composition according to claim 1, wherein the amount of the glass fibers is at least 20.0 wt % with respect to the composition.

17. The composition according to claim 1, wherein the amount of d2) is 11.0 to 30.0 wt %, with respect to the total composition.

18. The composition according to claim 1, wherein the amount of b) with respect to the total of a) and b) is 0 wt %.

19. The composition according to claim 1, wherein the sum of a), b), c) and d) is at least 98.0 wt % of the total composition.

20. A process for adhering a first part to a second part, comprising the steps of:
molding a first part from a first composition, wherein the first composition is the composition according to claim 1, and
pressing the first part and the second part together with an adhesive inbetween.

21. The process according to claim 20, wherein the process does not comprise treating a surface of the first part by plasma or flame.

22. A composition comprising
a) a propylene homopolymer and/or a propylene copolymer consisting of at least 70.0 wt % of propylene monomer units and at most 30.0 wt % of comonomer units selected from ethylene monomer units and α-olefin monomer units having 4 to 10 carbon atoms,
b) an ethylene-α-olefin copolymer,
c) glass fibers and
d) a reaction product of d1) a functionalized polypropylene and d2) a polyetheramine, wherein the total amount of a) and b) is 10.0 to 50.0 wt % with respect to the total composition,
the amount of b) with respect to the total of a) and b) is 20.0 to 40.0 wt %,
the amount of c) is 5.0 to 50.0 wt % with respect to the total composition,
the amount of d1) is greater than or equal to 39.39 wt % and less than or equal to 45 wt %, with respect to the total composition,
the amount of d2) is at least 5 wt % with respect to the total composition and the weight ratio of d2) to d1) is 0.25 to 1.00,
wherein the composition comprises a heterophasic propylene copolymer consisting of a1) a matrix and b1) a dispersed phase, wherein a) comprises a1) and b) comprises b1).
the sum of a), b), c) and d) is at least 98.0 wt % of the total composition.

23. The composition of claim 22, wherein a) further comprises a propylene homopolymer added as a separate component from the heterophasic propylene copolymer.

* * * * *